(12) United States Patent
Pitzel

(10) Patent No.: US 9,679,321 B1
(45) Date of Patent: Jun. 13, 2017

(54) PRODUCT IDENTIFICATION VALIDATION

(71) Applicant: Amazon Technologies, Inc., Reno, NV (US)

(72) Inventor: Bradley John Pitzel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 595 days.

(21) Appl. No.: 14/032,880

(22) Filed: Sep. 20, 2013

(51) Int. Cl.
  *G06Q 30/06* (2012.01)

(52) U.S. Cl.
  CPC ................. *G06Q 30/0609* (2013.01)

(58) Field of Classification Search
  None
  See application file for complete search history.

(56) References Cited

U.S. PATENT DOCUMENTS

| | | |
|---|---|---|
| 2010/0059589 A1 | 3/2010 | Goncalves et al. |
| 2013/0166464 A1* | 6/2013 | Schneider ............ G06Q 30/06 705/318 |

\* cited by examiner

*Primary Examiner* — Shay S Glass
(74) *Attorney, Agent, or Firm* — Thorpe North & Western LLP

(57) ABSTRACT

The technology may receive a product identification from a merchant and evaluate the product identification against evaluation rules to determine a likelihood of whether the product identification is valid for a product associated with the product identification.

5 Claims, 7 Drawing Sheets

PRODUCT IDENTIFICATION VALIDATION

BACKGROUND

Electronic retail stores may have a number of advantages over traditional brick-and-mortar stores. For example, electronic retail stores may not be limited to specific hours of operation or geography. As a result, electronic retail stores may enable consumers to shop virtually whenever and wherever is convenient to the consumer. Additionally, electronic retail stores may provide a wider selection of products because electronic stores may not be constrained by the availability of a physical show room floor. Also, prices of products may be lower from electronic retailers that do not maintain a physical store presence.

The use of machine-readable identification tags or codes on goods has become ubiquitous. Both electronic and brick-and-mortar retailers commonly use product identification codes, numbers, symbols, or the like to identify products, manage inventory, track sales and so forth. Optically readable tags, such as barcodes, QR codes and the like may enable the quick and automated identification of goods. For example, in the retail industry the Uniform Product Code (UPC) barcode is widely used. The Universal Product Code (UPC) is an example of a product identification code that has been widely adopted in the United States. Other non-limiting example product identification codes include the MPN (Manufacturer Part Number), EAN (International Article Number), ASIN (Amazon Standard Identification Number), ISBN (International Standard Book Number), Global Trade Item Number (GTIN) and JAN (Japanese Article Number).

In some instances where a retailer physically manages the products being sold, product identification codes can be physically inspected and verified. However, some electronic retailers sell products to customers from a third party merchant and do not physically manage the product. As a result, the retailer may be unable to physically verify the accuracy of a product identification code submitted by the third party retailer. If the third party submits inaccurate or fraudulent product identification codes to the retailer, then management of the product catalog may be difficult.

DETAILED DESCRIPTION

A technology is described that may receive a product identification from a merchant and evaluate the product identification against evaluation rules to determine whether the product identification is likely valid for a product purported to be associated with the product identification.

As a more specific example, an electronic retailer may list any number of products for sale for any number of third-party merchants. When a merchant wishes to list a product for sale through the electronic retailer, the merchant may submit information about the product, including a product identification code, such as a UPC code (number). The retailer may wish to verify that the UPC code is likely valid for use with the product (information) with which the code is being submitted. The retailer may evaluate the UPC code against available evaluation rules to determine whether the UPC code is likely valid and to determine whether the UPC code is likely valid as used with the product. For example, a retailer system may consider brand associations, duplicate use of UPC codes, reservation of UPC codes for particular purposes and so forth in determining a likelihood or probability of whether the UPC code is valid. The retailer may notify the merchant of the results of the evaluation, particularly if the retailer determines that the UPC is likely invalid.

Figure 1:
FIG. 1 is an illustration of a content page for product submission and a product code rejection message in accordance with an example of the present technology.

FIG. 1 illustrates a form page 110 for an electronic retailer. The form page in this example may be a product submission page. The product submission page may include a variety of information, links, user account information, a search query input box and so forth. The product submission page may be structured to facilitate and receive input of product details from a merchant wishing to sell a product through the retailer. For example, the product submission page may have various fields for receiving a merchant name and address, a product title and description, a price, shipping options, a product identification 115 such as a UPC, and so forth. The product submission page may further enable merchants to upload images associated with the product. The image upload may also be used to upload or capture images of the product identification for visual/optical verification or correlation of the product identification 115 entered into the product identification field.

After the system has evaluated the product identification 115, a notice 120 may be given to the merchant as to whether the product identification code is likely valid. The notice may be provided in a popup window, overlay, or another user interface control. For example, FIG. 1 illustrates a notice 120 that the product identification 115 submitted is likely not valid, with a suggestion to check the number and try again.

Solutions for use of product identifications prior to the present technology have been unable to validate a product identification to ensure the product identification belongs to a product with which the product identification has been associated. For example, a merchant may submit a shoe product to a retailer for sale and use a UPC code for a computer product. Prior solutions have been unable to determine that the UPC code for the computer product is not applicable to the shoe product. Some merchants may manage a large number of products or brands and management of product identifications within an individual brand may be challenging. At a larger scale of managing a large number of such merchants with an even larger portfolio of products and brands, the task is more complex. Additional complexity may result from intentional misrepresentations of product identifications that merchants may use in order to list a product for sale.

Some prior solutions to better manage product identifications have included creation of a database to which a lookup is performed to see if the product already exists. A problem with such a simple solution is that many product identifications may be available which are valid but which are not in the database. Thus, no conclusion as to the validity of the product identification may be had from such a solution. Another solution involves the use of check digits to check that a product identification is valid. A check digit is a form of redundancy check used for error detection on identification numbers. A check digit consists of one or more digits computed from other digits (or letters) in an input identification number. With a check digit, simple errors in the input of a series of characters (usually digits) may be detected, such as a mistyped digit or some permutation of two successive digits. While a check digit may be used to determine whether a product identification has been correctly entered, check digits provide no indication of which product the identification number is associated with.

The present technology may use database lookups and check digits to evaluate product identifications submitted by merchants, but may also use evaluation rules to evaluate product identifications for which no conclusion of validity may be made on the basis of database lookups or the use of check digits alone. Because there is no exhaustive resource for identifying each potential identification number and uses of a product association with that identification number, the present technology may use the evaluation rules to determine a validity likelihood for an input product identification. For example, after processing the product identification, a result may identify the product identification as 'suspected good', 'suspected wrong', etc. In some cases, a determination may be made that the product identification is clearly wrong, such as when use of a check digit identifies an error, when the product identification is missing (i.e., not entered/submitted by the merchant), when the product identification is already being used or when the product identification is a reserved identification, as will be described in further detail below.

The present technology may thus enable an electronic retailer to improve catalog quality by identifying and reducing the number of errors in product identifications submitted by merchants. When a catalog of products becomes sufficiently large—to the extent of having millions or even billions of products, maintaining a high quality catalog that is useful to customers may be valuable to an electronic retailer.

Figure 2:
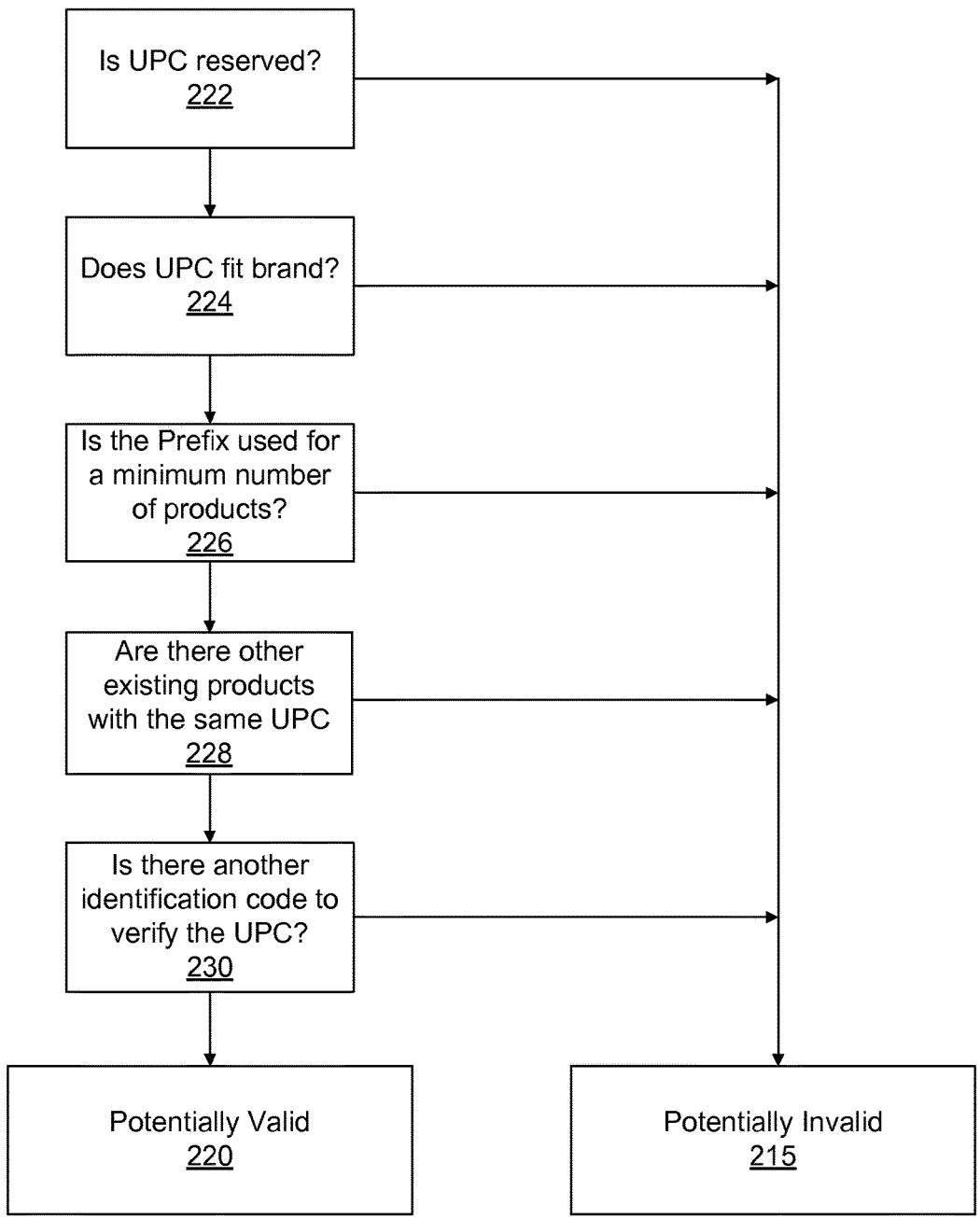
FIG. 2 is a decision diagram of evaluation rules for evaluating product identifications in accordance with an example of the present technology.

Referring now to FIG. 2, an example diagram is provided illustrating some evaluation rules which may be used to evaluate whether a product identification is valid 220 and whether the product identification is correctly associated with the appropriate product. The example rules illustrated include checking to see whether the product identification (a UPC in this case) is reserved 222, whether the UPC fits a particular brand 224, whether the prefix of the UPC is used for a minimum number of products 226, whether there are other existing products with the same UPC 228 and whether there is another identification code available from the merchant to verify the UPC 230.

To determine whether a UPC is a reserved UPC 222, a numbering scheme of the UPC may be referenced. The first digit of a UPC indicates the number system to be used for the subsequent digits. The following number system digits and associated numbering schemes are as follows:

0, 1, 6, 7, 8: These first digits are used for a majority of products.

2: This digit is reserved for local use (store/warehouse) and for items sold by variable weight. UPCs with the first digit '2' are commonly variable-weight items, such as meats, fresh fruits and vegetables, and these products have the UPC assigned thereto by the store selling the products if the products are packaged at the store.

3: This digit is reserved for use with pharmaceutical drugs to indicate that a remainder of the UPC is a National Drug Code number. These UPCs are commonly referred to as UPN Codes.

4: This digit is reserved for local use (store/warehouse) and UPCs with the first digit '4' are commonly used for loyalty cards or store coupons.

5, 9: These digits are reserved for use with coupons, such as manufacturer coupons.

In the example of UPCs, if a product identification submitted by a merchant includes a 5 or a 9, for example, then the present technology may be used to determine that the product identification is invalid 215 or likely invalid as used for the product because the first digits 5 and 9 are reserved for use with coupons.

The present technology may determine whether a UPC likely fits a brand 224. For example, many UPC prefixes are "owned" by particular brands. GS1 is an international organization that is commonly used to identify products and the like with global, unique identification numbers. GS1 is active in various industries such as apparel/general merchandise (i.e. shoes, home furnishings, sporting goods, etc.), consumer packaged goods/grocery, food service, fresh foods, and healthcare. GS1 is an example organization that thus manages some aspects of product identifications.

In one implementation, a retailer system may send a query to a GS1 server to determine whether a prefix (i.e., the first 6, 7, 8 or 9 digits of the UPC) of a UPC submitted by a merchant is valid, or rather that the prefix has been assigned to a company. If the prefix has not been assigned then the UPC is likely not valid. In a more specific implementation, the retailer system may evaluate whether the use of the UPC submitted by the merchant is consistent with an industry in which the UPC prefix is designated. For example, if GS1 indicates that the prefix is for use with beverage products or that the prefix is registered to a company that primarily or exclusively sells beverage products and the merchant submitting the UPC with the prefix is attempting to use the UPC with an electronic device, then the UPC is likely not valid.

In one implementation, a retailer system may send a query to a GS1 server to identify whether a prefix of a product identification received from a merchant belongs to a particular brand. The retailer system may compare a company or registrant name associated with the prefix against a brand of the product submitted by the merchant to determine whether the brands match, at least to a minimum level of certainty. For example, a merchant may submit a UPC with the product brand of "NameBrand". A lookup for the UPC (or the UPC prefix) on the GS1 server may be performed which may indicate that the UPC prefix belongs to a company called "NameBrand Corp USA". Because the company name contains the brand submitted by the merchant, a determination may be made that the UPC is likely valid for the brand with relatively high confidence. In another example, the merchant may submit the UPC with the product brand of "NameBrand". A lookup of the UPC on GS1 may indicate that the prefix belongs to a company called "The Product Group Ltd". While this instance may appear that the UPC is invalid for the brand NameBrand because the company name returned in the loopkup does not match, in reality "The Product Group Ltd" may be licensed to use the brand "NameBrand" on a set of products. Therefore, if the GS1 lookup returns a company name that does not match the brand submitted by the merchant, a positive determination that the use of the UPC with the submitted brand is invalid may not be made with high confidence.

When a merchant submits a product identification that is associated with a brand other than a brand indicated for the product being submitted, the retailer system may determine that the product identification is likely invalid 215 and may notify the merchant accordingly. However, because a relationship between a company and a brand may be complicated as described above, consideration of an industry for products or corporations associated with the prefix registered with GS1 and products or other information submitted by a merchant may result in more efficient or accurate determination of whether a UPC is likely valid.

As another example, a retailer may analyze an existing product catalog to evaluate the use of various UPC prefixes with a particular brand. If a threshold minimum number of products exist in the catalog belonging to a particular brand and which also share a common UPC prefix, then an assumption may be made that newly submitted products using this same UPC prefix and associated with the brand are likely valid 220. In other words, referring to FIG. 2, if the prefix is used for a minimum number of products 226 associated with a particular brand and the current product is not associated with the brand, then the UPC may be identified as potentially invalid 215. As another example, when a prefix is not used for a minimum number of products associated with a brand, including when a prefix is a previously unused prefix, and a merchant submits a product using the prefix, an assumption may be made that the product identification is potentially invalid. Alternatively, the assumption may be that the product identification is potentially valid. When an assumption or determination of likelihood of invalidity is made, the retail system may notify the merchant and may request that the merchant double check the number, re-enter the number, enter a new number, contact the electronic retailer, or submit evidence of the accuracy or validity of the product identification number, etc.

The retail system may determine whether there are other existing products with the same product identification or the same UPC 228. This determination may be handled ways depending on the desired applications or available computing or human resources. For example, if no other products in a product data store use the same product identification then the product identification may be potentially valid 220. If one or more other products in the product data store use the same product identification, then a further analysis may be performed to determine whether the product identification is likely valid for the product. For example, if another product uses the same product identification and has other product information (e.g., title, description, etc.) that is similar, at least to within a predetermined degree of error, then the retail system may determine that the product identification is likely valid. If another product uses the same product identification and has other product information that is dissimilar, or which has a similarity outside of the predetermined degree of error, then the retail system may determine that the product identification as applied to the submitted product is potentially invalid 215.

When the submitted product identification matches a product identification already in the retail system, the retail system may prompt the merchant to confirm whether the submitted product is the same as the existing product already associated with the product identification. If the merchant indicates that the product is the same, then the product identification may be considered valid or potentially valid 220, while an indication that the product is not the same may result in the product identification being considered potentially invalid 215 or wrong.

In some examples, a merchant may submit multiple product identification numbers for a particular product. For example, the merchant may submit a book for sale and include a UPC and an ISBN. When a validity of the UPC as used with the book is in question, the ISBN may be used in a similar fashion as the UPC to determine whether the ISBN is valid (see 230), whether the ISBN is reserved for something other than a product for sale, whether the ISBN has been used on other books and so forth. In one example, a lookup may be performed using the ISBN on an internal or external data store to look for any books using the ISBN. If a match is found for the ISBN, including information about the book, such as a title or author, the information may be compared against information submitted with the UPC to determine whether the UPC is likely valid.

The example rules illustrated in FIG. 2 are non-limiting examples and many other different evaluation rules or variations on the evaluation rules may also be implemented, which are intended to be within the scope of this disclosure. In addition, while FIG. 2 illustrates processing of a UPC in a serial manner beginning with one evaluation rule and ending with another, processing of UPCs against the various evaluation rules may be performed in parallel or in any desired serial order, and the evaluation rules may be used independent of the result of any other particular rule.

While the present technology may be used for product submissions from merchants as the products submissions are received, the technology may also be retroactively applied to past product submissions to analyze, manage or clean an existing product catalog. The following discussion may relate to the application of the present technology against an existing catalog to manage the catalog and identify characteristics of product identification used for processing of subsequently received product identifications from merchants. In at least some of the examples in the following discussion, the retailer uses a retailer identification number for identifying products in addition to the UPC, EAN, etc. In other words, the retailer may assign a retailer identification number to products received from merchants which may already have one or more UPCs or other product identifications associated therewith.

In examples where retailer identification numbers are associated with multiple UPCs, an analysis of the UPCs may proceed by looking at a first of the multiple UPCs associated with the retail identification number without considering the other multiple UPCs. In another aspect, the analysis may consider each of the existing UPCs associated with the retail identification number. The assumption is that some or all but one of the UPCs may not be correct or may be in conflict. If a UPC is unavailable, the query may look for an EAN, GTIN, ISBN or other product identification. For purposes of discussion, the following description may refer to UPCs, but the discussion may also be applicable to instances where a UPC is unavailable and an EAN or other number is used in place of the UPC.

The present technology may be used to analyze existing catalog data, and provide a percentage estimate of how many UPCs are known or suspected to be from spammers (i.e., merchants who submit millions of virtual products, often using fake UPCs), a percentage of how many UPCs are known or suspected to be using coupon or other reserved codes, a percentage of UPCs that are suspected as incorrect, and a percentage of UPCs suspected as good. The technology may provide insight into a category to help prioritize solutions to improve catalog quality. Merchants selling through the retailer may receive fewer listing errors due to invalid UPC data in the catalog and customers shopping at the retailer may see fewer duplicate products and fewer errors on product pages.

One example implementation for improving the product catalog and customer experience may involve classification of UPCs or UPC prefixes into one of a plurality of buckets which identify UPCs as suspected good or valid, suspected wrong or invalid, reserved, etc. Each retail identification number may be classified according to an evaluation result using evaluation rules. In the following example, five buckets may be used for classification:

1. Suspected Good—Unique UPC
   a. This classification may be applied for UPCs which are unique and not used on other products, at least for the first product classified using the UPC.
   b. An analysis may result in an estimated count of the unique UPCs found that are believed to belong to the brand.
2. Suspected Good—Duplicate UPC
   a. This classification may be applied for UPCs which are not unique or which are a duplicate of a unique UPC.
   b. A merchant may have a number of unique retailer identification numbers used for each of the unique UPCs and may further have an additional number of unique retailer identification numbers for "suspected good" UPCs beyond the unique UPC count.
   c. Example: If a suspected good UPC occurs with three separate retailer identification numbers, the products may be tallied as one "Suspected Good—Unique UPC" retailer identification number, and two "Suspected Good—Duplicate UPC" retailer identification numbers.
3. No UPC on retailer identification number
   a. A count of retailer identification numbers without UPCs may be made.
   b. Merchants having products listed for sale without a UPC may be notified to correct the deficiency and may be given a period of time for correction.
4. Reserved UPC
   a. A count may be made of retailer identification numbers with invalid UPCs, such as UPCs reserved for coupon codes, internal use, etc.
5. Suspected Wrong UPC
   a. This classification may include any UPC that does not fall into the above categories.

The classification may be performed using the following pseudocode logic:
  WHEN (No UPC), THEN 'No UPC on retailer identification number';
  WHEN (prefix is an ISBN) THEN 'Suspected Wrong';
  WHEN (prefix is reserved) THEN 'Reserved UPC';
  WHEN (a brand's retailer identification numbers with the prefix)>Max_Occurence_Count (defined below) THEN 'Suspected Good';
  WHEN (Average number of unique merchants per retailer identification number)>Merchant_Density (defined below) THEN 'Suspected Good';
  WHEN (percentage of a brand's retailer identification numbers with the prefix)<Min_Percentage (defined below) THEN 'Suspected Wrong';
  WHEN (prefixes used with retailer identification numbers)<Min_Occurence_Count (defined below) THEN 'Suspected Wrong';
  ELSE 'Suspected Good'.

Max_occurrence_count: If the count of retailer identification numbers with the prefix is above this threshold, the prefix is "Suspected Good". Merchants who submit many products with a same bad UPC prefix may be counted as a false positive, meaning that the system may otherwise deem the UPC prefix good because of the number of products submitted. As an example, the Max_occurrence_count may be 100 and instances where 100 or more retailer identification numbers are used with the prefix may be an indication that the prefix is suspected good.

Merchant_Density: If the ratio of unique merchants with buyable offers per retailer identification number is above a certain threshold for the prefix, the UPCs may be "Suspected Good". Retailer identification numbers with a higher count of unique merchants are more likely to be 'good' retailer identification numbers and therefore more likely to have good UPCs.

Min_percentage: If the percentage of retailer identification numbers with the prefix is below this predetermined threshold, the prefix is "Suspected Wrong". Rarely occurring prefixes for a brand are more likely to be bad or incorrect UPCs.

Minimum occurrence count: If the count of retailer identification numbers with the prefix is below this predetermined threshold, the prefix is "Suspected Wrong". UPC prefixes with only one or two retailer identification numbers for large scale retailers are frequently bad, as determined from sampling data. However, if the brand has few retailer identification numbers through the retailer, even one or two retailer identification numbers may still be above the "min_percentage" and thus may be counted as a "Suspected Good" prefix if this parameter is not used.

The present UPC validation service may improve the accuracy of UPCs in the catalog or may reduce existing catalog defects, particularly for selected top or large brands. For example, the present technology may not have as great of an impact on the catalog quality for smaller brands, such as brands with less than 1,000 products. More accurate UPCs may mean merchants no longer receive unfixable errors due to inaccurate UPC data in the retailer catalog. Further, merchants using bulk inventory feeds may have a greater rate of success listing against the correct product using this technology. Duplicate product listings in the catalog caused by invalid or missing UPCs may be removed. Known bad UPCs may be removed from product listings, reducing the chance of accidental mismatches of incorrect products in the future.

It is noted that while reference is made in this and other examples to products and product catalogs, the technology may also be used in other applications. Indeed, any other item may also be considered using appropriate evaluation rules, such as coupons or physical objects which may not be for sale. In addition, while many of the examples of the technology described herein are directed to the context of electronic retail, the technology may be applied to a wide variety of other contexts outside of retail transactions. For example, rather than products associated with a product identification, any type of item associated with an item identification may be used. Some non-limiting example items include services, service listings, images, forum threads, forum posts, text or multimedia documents, news articles, blog posts, status updates, social media messages, emails, instant messages or any other suitable type of item to which the technology may be applied, as well as any combinations of the foregoing examples.

While many of the examples of the technology described herein are directed to validation of product identifications submitted with physical products, the technology may also be applied to digital products or media as well, such as the purchase and/or consumption of digital media. In other words the submission, purchase and/or consumption of digital media, such as a video, an audio recording, an e-book or other textual document, a game, an "app" (i.e., software application), digital artwork, etc. may be managed using the present product identification validation technology.

Figure 3:
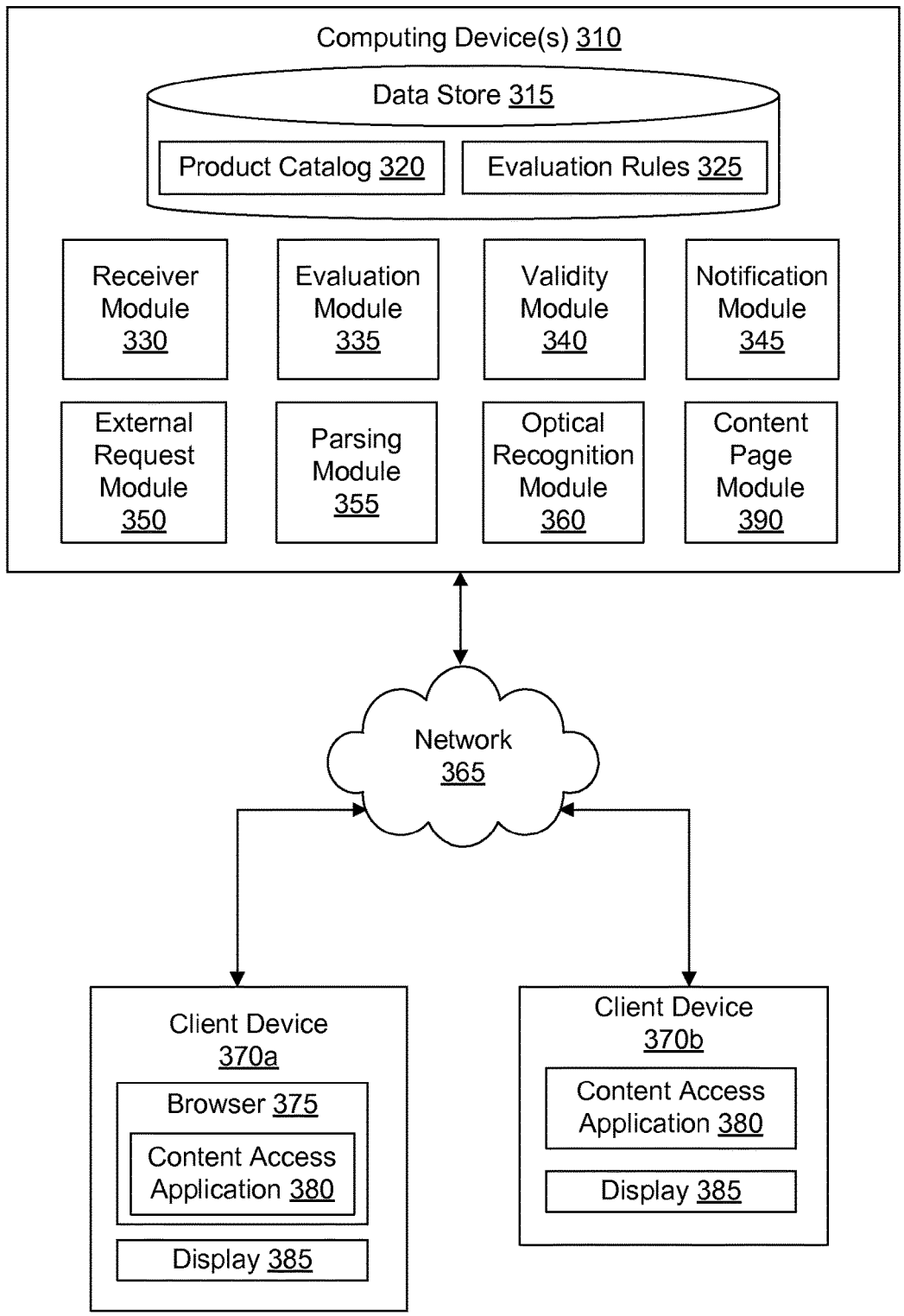
FIG. 3 is a block diagram of a product identification validation system in accordance with an example of the present technology.

Referring now to FIG. 3, a block diagram of another example product identification validation system is illustrated in accordance with an example of the present technology. The system may be implemented on one or more computing devices 310 and/or client devices 370a-370b and may be implemented using a network 365. The system may include a data store 315 and any number of modules 330, 335, 340, 345, 350, 355, 360, 390 for storing and processing product identification and validation data.

The product catalog data store 320 may include, for example, the products available for purchase or consumption from an electronic retailer and may be structured for suitable display on a client device's 370a, 370b and display 385 via a browser 375 or content access application 380, such as in the form of a webpage or website. The product catalog data store 320 may also include product identifications (e.g., such as alphanumeric values or the like) for unique product identification, product designations in purchase histories and so forth.

The evaluation rules data store 325 may include, for example, evaluation rules for evaluating product identifications. The evaluation rules may include any of the evaluation rules described herein or variations thereof, as well as any other evaluation rule consistent with the present technology.

The system may include a receiver module 330. The receiver module 330 may receive a product identification from a merchant. In addition to the product identification, the receiver module may receive additional product information as well. Product information received via the receiver module 330 may be stored in the product catalog data store 320. The receiver module 330 may generate an associated graphical user interface for display to a merchant to enable the merchant to interface with the system.

The system may include an evaluation module 335. The evaluation module 335 may be used to evaluate the product identification against the evaluation rules. For example, the evaluation module 335 may determine whether the product identification is present, whether the product identification is used on other existing products, whether other product identifications are available which can be used to validate the product identification and so forth. The evaluation module 335 may produce an evaluation result as a result of evaluating the product identification. The evaluation result may include a result for each of the evaluation rules against which the product identification is evaluated.

A validity module 340 may use the evaluation result to determine a likely validity of the product identification. More specifically, the validity module 340 may determine a likely validity of the product identification as used for a product associated with the product identification. For example, the validity module 340 may look at the evaluation result of an evaluation rule for evaluating whether a UPC is reserved. If the evaluation result indicates that the UPC is not reserved, then the validity module 340 may determine that the UPC is potentially valid. If the evaluation result indicates that the UPC is reserved, then the validity module 340 may determine that the UPC is potentially or actually invalid. The validity module 340 may thus determine whether the product identification is incorrect, improper, missing, invalid, etc. using the evaluation rules.

The system may include a notification module 345. The notification module 345 may be used to notify the merchant of invalidity of the product identification when the product identification is reserved for non-product use. In another example, the notification module 345 may be used to notify the merchant of invalidity of the product identification when the product identification belongs to a block of product identifications registered to a registrant other than the merchant or a manufacturer of the product associated with the product identification and as indicated by the merchant.

The notification module 345 may notify the merchant differently according to whether the product identification is incorrect, improper or invalid. For example, a different message may be provided for display to the merchant depending on an error associated with the incorrect, improper or invalid identification. An incorrect UPC may be a UPC used for a product with which the UPC is not actually associated, as may be determined from data store lookups, processing of evaluation rules, duplicate entries with significantly different descriptions, mismatched brands, etc. An improper UPC may be a product identification that was entered by the merchant but which is not actually a UPC. An invalid UPC may be a UPC which is reserved or for which a checksum using the check digit failed. Different error messages for the different errors may include, for example, requesting the merchant to enter a new UPC when the UPC is invalid or improper, or to verify the UPC or contact merchant support services when the UPC is identified as incorrect. While some distinction is provided here for incorrect, improper and invalid product identifications, each of these categorizations may more broadly be referred to as "invalid" because the product identification is unacceptable for one reason or another.

The system may include an external request module 350. The external request module 350 may request a lookup in an external database of product identifications known to be valid. The external request module 350 may provide a result of the lookup to the validity module 340 for use in determining the likely validity of the product identification submitted by the merchant.

The system may include a parsing module 355 to parse product data received with the product identification from the merchant. The parsing module 355 may be used to determine whether the product data matches the product identification or to determine whether the parsed product data matches a different product identification. For example, when the submitted product shares a UPC with an existing product, the parsing module 355 may parse the title, product description, manufacturer and other product data of the existing product and the submitted product to determine whether the products sufficiently correspond. A result of the parsing may be used by the validity module 340 to determine the likely validity of the product identification as used with the submitted product using the evaluation rules.

The system may include an optical recognition module 360 to optically recognize an image of the product identification (e.g., UPC) and compare the product identification received from the merchant against the image. For example, the image may be received from the merchant via the receiver module 330 in response to the merchant capturing or uploading the image. In another example, the optical recognition module 360 may be used in a warehouse to scan UPCs or capture images of UPCs of products with a known retailer identification number as the products are conveyed past a camera on a conveyor to determine whether the correct UPC is associated with the retailer identification number.

The system may include a content page module 390 for displaying content pages, including search fields, user interfaces, product catalog data and any other suitable object or data for facilitating or enhancing user interaction with the electronic retailer or validation of product identifications. The content page module 390 may provide content page data for display on the client device 370a, 370b.

The computing device(s) 310 may include a server. The data store 315 may store product information, user information and similarities datasets for the server. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

Client devices 370a-370b may access data, content pages, content items and so forth via the computing device 310 over a network 365. Example client devices 370a-370b may include, but are not limited to, a desktop computer, a laptop, a tablet, a mobile device, a television, a cell phone, a smart phone, a hand held messaging device, a set-top box, a gaming console, a personal data assistant, an electronic book reader, heads up display (HUD) glasses, a car navigation system, or any device with a display 385 that may receive and present the media content.

The system may be implemented across one or more computing device(s) 310, 370a, 370b connected via a network 365. For example, a computing device 310 may include a data store 315 and various engines and/or modules such as those described above and such modules may be executable by a processor of the computing device 310.

The modules that have been described may be stored on, accessed by, accessed through, or executed by a computing device 310. The computing device 310 may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device 310 is referred to herein in the singular form. Even though the computing device 310 is referred to in the singular form, however, it is understood that a plurality of computing devices may be employed in the various arrangements described above.

Various applications and/or other functionality may be executed in the computing device 310 according to various embodiments, which applications and/or functionality may be represented at least in part by the modules that have been described. Also, various data may be stored in a data store 315 that is accessible to the computing device 310. The data store 315 may be representative of a plurality of data stores as may be appreciated. The data stored in the data store 315, for example, may be associated with the operation of the various applications and/or functional entities described. The components executed on the computing device 310 may include the modules described, as well as various other applications, services, processes, systems, engines or functionality not discussed in detail herein.

The client devices 370a, 370b shown in FIG. 3 are representative of a plurality of client devices that may be coupled to the network. The client devices may communicate with the computing device over any appropriate network, including an intranet, the Internet, a cellular network, a local area network (LAN), a wide area network (WAN), a wireless data network or a similar network or combination of networks.

Each client device 370a, 370b may include a respective display 385. The display 385 may comprise, for example, one or more devices such as cathode ray tubes (CRTs), liquid crystal display (LCD) screens, gas plasma based flat panel displays, LCD projectors, or other types of display devices, etc.

Each client device 370a, 370b may be configured to execute various applications such as a browser 375, a respective page or content access application 380 for an online retail store and/or other applications. The browser 375 may be executed in a client device 370a, 370b, for example, to access and render content pages, such as web pages or other network content served up by the computing device 310 and/or other servers. The content access application is executed to obtain and render for display content features from the server or computing device 310, or other services and/or local storage media.

In some embodiments, the content access application 380 may correspond to code that is executed in the browser 375 or plug-ins to the browser 375. In other embodiments, the content access application 380 may correspond to a standalone application, such as a mobile application. The client device 370a, 370b may be configured to execute applications beyond those mentioned above, such as, for example, mobile applications, email applications, instant message applications and/or other applications. Users at client devices 370a, 370b may access content features through content display devices or through content access applications 380 executed in the client devices 370a, 370b.

Although a specific structure may be described herein that defines server-side roles (e.g., of content page delivery) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

In some examples, the system may evaluate UPCs at a brand level, such as based on UPC prefixes or the like. While GS1 data may be used to identify whether a company has purchased a particular block of UPCs, as described previously, this information does not identify the use of the block of UPCs at a brand level, and many companies may have a large number of brands for products. These companies may manage the product portfolio for the different brands by using a particular subset of the block of UPCs for each individual brand. The present technology may estimate the quality of UPCs in a product category by analyzing how often certain UPC prefixes appear. Since companies buy blocks of UPCs with the same prefix, most of a particular brand's UPCs are often likely to share a same prefix or group of prefixes. If a prefix appears in the product catalog for a small percentage of products, a suspicion may be raised that all UPCs using this prefix are 'incorrect'. Such methodology may not necessarily provide a perfectly reliable estimate, but may be made more accurate by eliminating small brands (<1000 products) and obviously fake UPCS (such as reserved UPCs, for example) from consideration of validity.

Manual or human assistance may be provided to merchants in resolving UPCs deemed potentially invalid in order to address issues where a valid UPC is incorrectly identified as potentially invalid. In one example, submissions with incorrect UPCs may trigger an alert or notification to the merchant with instructions to fix the UPC defect. If the merchant does not fix the issue within a defined time period, such as 30 days for example, the retailer identification numbers associated with the defective UPC may be quarantined (suppressed from search and browse functions on an electronic store of the retailer, but still purchasable if found by a customer such as by direct linking).

The first few digits of product codes (UPC, EAN, JAN, etc.) may represent a company prefix. For example, the first 7-10 digits of UPCs contain the company prefix, while the first 6-11 digits of EANs contain the company prefix. Ranges of company prefixes may be assigned to organizations within the company which in turn may assign UPCs within the allotted prefix range to products for the organization.

For each UPC entered into the UPC validation service, a list of one or more brands associated with the UPC prefix may be identified. The prefix may be checked against the UPC prefixes on retailer identification numbers in the catalog to determine whether the brand for the entered UPC corresponds with other brand(s) associated with the UPC prefixes in the catalog. Using prefixes associated with brands to perform checking may be less accurate than checking entered UPCs against extensive lists of actual UPCs, but with the benefit of being easier to obtain than complete authoritative catalogs.

While brand level validation is mentioned as one example implementation, any of a variety of other implementations may also be made, such as product-type implementations, for example, where UPCs are determined to be valid at least in part based on whether the UPCs match a particular product type. This alternative implementation may be an example where the product type is a subset of a brand, or where the brand is a subset of a product type.

An example goal is for UPC prefix rules to be obtained and updated without manual maintenance, so that retailer employees do not become a bottleneck to new product availability. Potential data sources for such prefix rules may include GS1, mining the existing retailer product catalog, mining incoming merchant submissions, notifications when fulfillment centers scan a UPC, and a merchant rating system for trusting UPC data for certain merchants/vendors. Manual overrides may be allowed for special cases and production issues.

The present UPC validation technology may use a single UPC attribute that is well supported in the retailer system to perform validation rather than use many, extensive authoritative catalog attributes which may be ever evolving. By relying on UPC prefixes, rather than lists of every product and UPC from a manufacturer, the evaluation rules may be more resilient to new product releases. UPC prefix rules may be quickly updated by merchants via a single self-service tool, allowing for quick fixes if critical product launches are impacted by obsolete validation rules.

Figure 4:
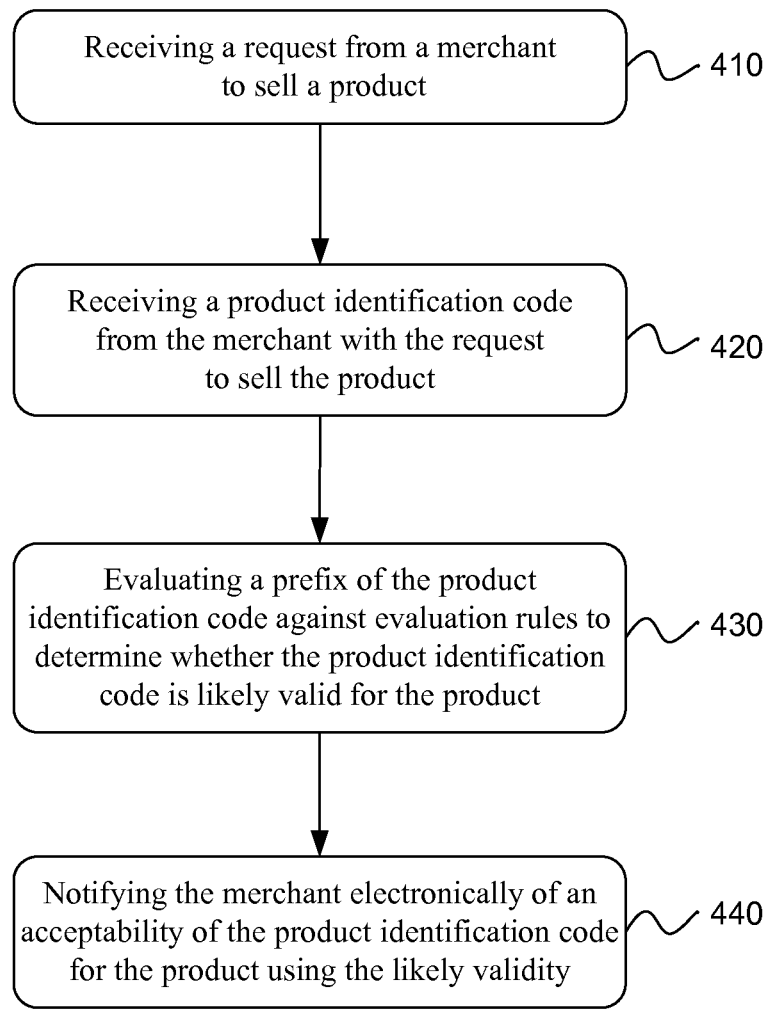
FIG. 4 is a flowchart illustrating a method of product identification validation using a prefix of the product identification in accordance with an example of the present technology.

Referring now to FIG. 4, a flow diagram of a method for validating product identifications is illustrated in accordance with an example of the present technology. The method may include receiving 410 a request from a merchant to sell a product. Also, a product identification code may be received 420 from the merchant with the request to sell the product. A prefix of the product identification code may be evaluated 430 against evaluation rules to determine whether the product identification code is likely valid for the product. The method may include notifying 440 the merchant electronically of an acceptability of the product identification code for the product using the likely validity.

In one example, the method may further include comparing the prefix of the product identification code against a data store of known product identification code blocks to determine whether the product identification code fits within a known product identification code block and to determine whether the merchant matches a registrant of the product identification code block. Also, rather than determining whether the merchant matches the registrant of the product identification code block, the method may determine whether a brand of the product matches a brand of the products being sold by the registrant. As used here, a product identification code block may refer to, for example, a block or group of product identification codes or product identification code prefixes purchased by a manufacturer for use by the manufacturer in identifying products manufactured by the manufacturer.

The method may include determining whether the product identification code is reserved for use other than on products by comparing the product identification code to a data store of reserved product identification codes. The product identification codes may be reserved for something other than products, such as coupons for example, or may be reserved for a particular brand of products when a company purchases a block of product identifications. Thus, the method may include comparing the product identification code with other product identification codes for a brand of the product to determine the likely validity. More specifically, the method may include comparing a prefix of the product identification code with other prefixes for the brand to determine whether the prefix is consistently used.

Figure 5:
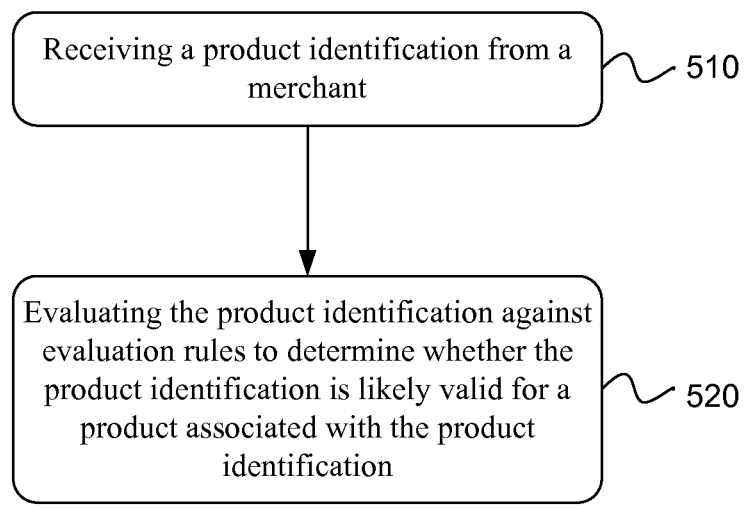
FIG. 5 is a flowchart illustrating a method of product identification validation in accordance with an example of the present technology.

Referring now to FIG. 5, a flow diagram of a method is illustrated in accordance with an example of the present technology. The method may include receiving 510 a product identification from a merchant and evaluating 520 the product identification against evaluation rules to determine whether the product identification is likely valid for a product associated with the product identification.

The method may further include determining whether a prefix of the product identification matches a prefix of product identifications for a minimum number of products in or associated with a brand. When a minimum number of products identification prefixes are associated with the brand, the method may determine whether the product associated with the product identification prefix matches the brand.

The method may include notifying the merchant electronically when the product identification is unlikely to be valid. The method may further include providing a set period of time for the merchant to provide a valid product identification. The set period of time may be zero, such as to require the merchant to submit a valid product identification before the product submission may be received. Alternatively, the set period of time may be longer, and extend for minutes, hours, days, weeks, or months, to allow the product submission to be received and subsequently corrected. In one aspect, the method may include quarantining a listing of the product until the valid product identification is received.

The product identification in the method may be a first product identification and the method may further include receiving a second product identification of a different type than the first product identification, as well as comparing a product associated with the second product identification with product information submitted with the first product identification to determine whether the first product identification is likely valid. The first or second product identifications may be selected from: a Universal Product Code (UPC), an International Article Number (EAN), a Global Trade Item Number (GTIN), a Manufacturer Part Number (MPN), an International Standard Book Number (ISBN), or a Japanese Article Number (JAN), an Amazon Standard Identification Number (ASIN), a Stock Keeping Unit (SKU), or any other suitable product identification.

The method may include performing a lookup on an external database external to a system of the electronic retailer to determine the likely validity of the product identification, such as a lookup in a GS1 database to determine whether a prefix of the product identification is owned by a particular company. In other words, the external database may be a data store which is managed or maintained by an entity other than the electronic retailer. As another example, a database of product identifications may be referenced to perform a lookup of a UPC included in the product submission to determine whether the submitted product identification is valid for the product being submitted with the product identification. When reference is made herein to a product being submitted, the product may not necessarily be physically be submitted, but the terminology may refer to the submission of product data or of a desire of a merchant to sell an identified product.

The method may include determining that the product identification is likely valid if the merchant is a trusted merchant, such as if past submissions by the merchant have been valid more than a minimum number of times or for at least a minimum percentage of submissions. The method may include identifying the product identification as more likely valid when a minimum number of other merchants use a prefix of the product identification with a same brand as a brand of the product associated with the product identification. The method may also include identifying the product identification as more likely valid when a minimum number of other merchants use the product identification with the product associated with the product identification.

The method may include identifying product identifications for products of a first defined category as less likely valid than for products of a second defined category. For example, analysis of product identifications associated with products or retailer identification numbers in a product data store may reveal that an "infant clothing" category is more likely to have invalid product identifications than a "home improvement" category. Thus, new submissions for the "infant clothing" category may be weighted so as to be more likely suspect or more likely invalid than new submissions for the "home improvement" category.

The method may include identifying the product identification as more likely valid when the product identification matches an existing product identification in a product identification data store than when a match is unavailable in the product identification data store. For example, submission of duplicate products being sold by multiple merchants may be more likely than submission of an entirely new product sold by an individual merchant. In one aspect, a product submission page may request that a merchant identify a product category for the product being submitted.

The method may include comparing the merchant identified product category with a product category of the existing product identification to determine whether the product categories match or are at least similar within a predetermined degree of error. If the product categories do not match, either within or without the predetermined degree of error, the merchant may be prompted to confirm whether the existing product for the existing product identification is the same as the product being submitted.

The method may include receiving an image of the product identification, such as by upload or image capture, after which optical character recognition or the like may be used to recognize or interpret the image of the product identification. In one aspect, the method may include scanning the product identification using a scanner, camera or the like. After a product identification has been captured, uploaded, scanned, etc., the product identification may be compared to the product identification received from the merchant to determine whether the scanned product identification is the same as the received product identification.

In some examples, this or other methods described herein may be implemented wholly or partially as computer readable program code executed by a processor and the computer readable code may be embodied on a non-transitory computer usable medium.

Figure 6:
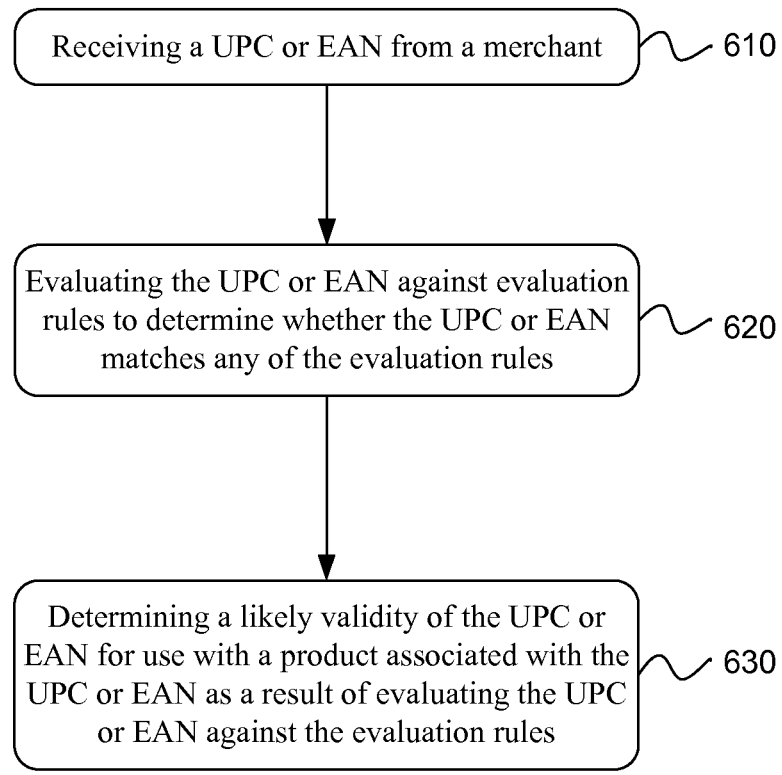
FIG. 6 is a flowchart illustrating a method of determining the likelihood of validity of a UPC or EAN in accordance with an example of the present technology.

Referring to FIG. 6, a flow diagram of a method of the present technology is illustrated in accordance with an example. The method may include receiving 610 a UPC or EAN from a merchant. The method may also include evaluating 620 the UPC or EAN against evaluation rules to determine whether the UPC or EAN matches any of the evaluation rules. The method may include determining 630 a likely validity of the UPC or EAN for use with a product associated with the UPC or EAN as a result of evaluating the UPC or EAN against the evaluation rules. In some examples, the merchant may be notified when the UPC or EAN is likely invalid.

Figure 7:
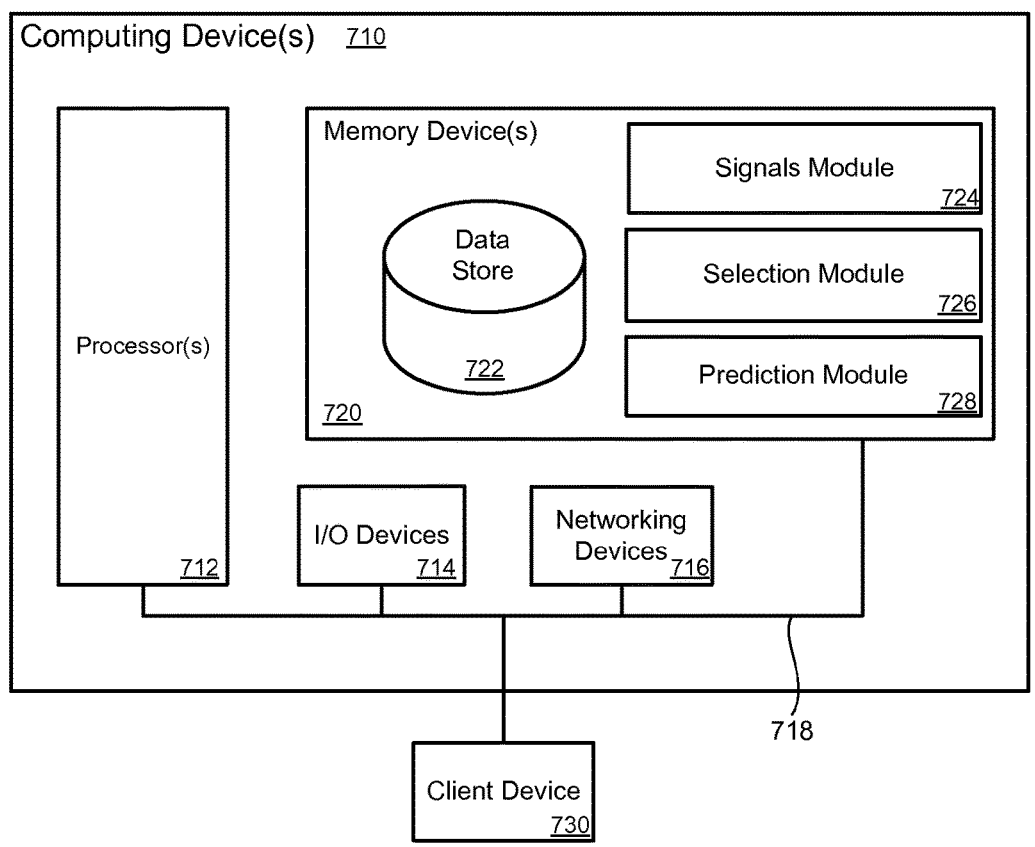
FIG. 7 is a block diagram illustrating an example of a computing device for product identification validation in accordance with an example of the present technology.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules that are executable by the processor(s) and data for the modules. Located in the memory device 720 are modules executable by the processor. For example, a validity module 724 and a notification module 726, as well as other modules, may be located in the memory device 720. A data store 722 may also be located in the memory device 720 for storing data related to the modules and other applications along with an operating system that is executable by the processor(s) 712.

The computing system 710 of FIG. 7 may be utilized for providing. The computing device 710 may further include or be in communication with a client device 730, which may include a display device. The client device 730 may be available for an administrator to use in interfacing with the computing device 710, such as to review operation of the system, make improvements to the system and so forth.

Various applications may be stored in the memory device 720 and may be executable by the processor(s) 712. Components or modules discussed in this description that may be implemented in the form of software using high programming level languages that are compiled, interpreted or executed using a hybrid of the methods.

The computing device 710 may also have access to I/O (input/output) devices 714 that are usable by the computing devices. An example of an I/O device 714 is a display screen that is available to display output from the computing devices. Other known I/O device may be used with the computing device as desired. Networking devices 716 and similar communication devices may be included in the computing device 710. The networking devices 716 may be wired or wireless networking devices 716 that connect to the internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor 712. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

It should be emphasized that many variations and modifications may be made to the above-described embodiments, the elements of which are to be understood as being among other acceptable examples. All such modifications and variations are intended to be included herein within the scope of this disclosure and protected by the following clauses and claims.

Various example embodiments of the disclosure can be described with respect to the following clauses:

Clause 1. A computer-implemented method for validating a product identification code, comprising:
under control of one or more computer systems configured with executable instructions:
  receiving a request from a merchant to sell a product in an online marketplace;
  receiving a product identification code for the product from the merchant with the request to sell the product;
  evaluating a prefix of the product identification code against evaluation rules to determine a likelihood of whether the product identification code is valid for product information of the product submitted with the request; and
  notifying the merchant electronically of an acceptability of the product identification code for the product using the likelihood of validity.

Clause 2. The computer-implemented method of clause 1, further comprising comparing the prefix of the product identification code against a data store of known product identification code blocks to determine whether the product identification code fits within a known product identification code block and to determine whether the merchant matches a registrant of the product identification code block.

Clause 3. The computer-implemented method of clause 1, further comprising determining whether the product identification code is reserved for use other than on products by comparing the product identification code to a data store of reserved product identification codes.

Clause 4. The computer-implemented method of clause 1, further comprising comparing the product identification code with other product identification codes for a brand of the product to determine the likelihood or validity.

Clause 5. The computer-implemented method of clause 1, wherein the product identification code is a UPC and the prefix includes at least six digits.

Clause 6. A computer-implemented method, comprising:
under control of one or more computer systems configured with executable instructions:
  receiving a product identification code and product information for selling a product in an online marketplace from a merchant;
  evaluating the product identification code against product identification code evaluation rules to determine a likelihood of whether the product identification code is valid for the product information submitted to the online marketplace; and
  providing a notification based at least in part on a result of evaluating the product identification code against the evaluation rules.

Clause 7. The computer-implemented method of clause 6, further comprising determining whether a prefix of the product identification code matches a prefix of product identification codes associated with a brand, the prefix of product identification codes associated with the brand being identified as associated with the brand when a minimum number of products in the brand have product identification codes with the prefix.

Clause 8. The computer-implemented method of clause 6, further notifying the merchant electronically when the product identification code is unlikely valid.

Clause 9. The computer-implemented method of clause 6, wherein the product identification code is a first product identification code, the method further comprising receiving a second product identification code of a different type than the first product identification code and comparing a product associated with the second product identification code with the product information submitted with the first product identification code to determine whether the first product identification code is likely valid based on a similarity of the product associated with the first product identification code to the product associated with the second product identification code.

Clause 10. The computer-implemented method of clause 6, further comprising identifying the product identification code as a product identification code selected from one of: a Universal Product Code (UPC), an International Article Number (EAN), a Global Trade Item Number (GTIN), a Manufacturer Part Number (MPN), an International Standard Book Number (ISBN), or a Japanese Article Number (JAN).

Clause 11. The computer-implemented method of clause 6, wherein evaluating the product identification code comprises evaluating a prefix of the product identification code.

Clause 12. The computer-implemented method of clause 6, further comprising determining that the product identification code is likely valid if the merchant is a trusted merchant.

Clause 13. The computer-implemented method of clause 6, further comprising performing a lookup on an external data store to determine the likely validity of the product identification code.

Clause 14. The computer-implemented method of clause 6, further comprising identifying product identification codes for products of a first defined product category as less likely valid than for products of a second defined product category.

Clause 15. The computer-implemented method of clause 6, further comprising identifying the product identification code as more likely valid when the product identification code matches an existing product identification code in a product identification data store than when a match is unavailable in the product identification data store.

Clause 16. The computer-implemented method of clause 6, further comprising identifying the product identification code as more likely valid when a minimum number of other merchants use a prefix of the product identification code with a same brand as a brand of the product associated with the product identification code.

Clause 17. The computer-implemented method of clause 6, further comprising identifying the product identification code as more likely valid when a minimum number of other merchants use the product identification code with the product associated with the product identification code.

Clause 18. A system, comprising:
one or more computing nodes, each of which comprises at least one processor and a memory, wherein the one or more computing nodes are configured to collectively implement:
a receiver module to receive a product identification from a merchant;
an evaluation rule data store to store evaluation rules for evaluating product identifications;
an evaluation module to evaluate the product identification against the evaluation rules; and
a validity module to determine a likelihood of validity of the product identification for a product associated with the product identification as a result of evaluation by the evaluation module.

Clause 19. The system of clause 18, further comprising a notification module to notify the merchant of invalidity of the product identification when the product identification is reserved for non-product use.

Clause 20. The system of clause 18, further comprising a notification module to notify the merchant of invalidity of the product identification when the product identification belongs to a block of product identifications registered to a registrant other than the merchant or a manufacturer of the product associated with the product identification and as indicated by the merchant.

Clause 21. The system of clause 18, further comprising a parsing module to parse product data received with the product identification from the merchant to determine whether the product data matches the product identification or to determine whether the product data matches a different product identification.

Clause 22. The system of clause 18, wherein the validity module determines whether the product identification is incorrect, improper or invalid using the evaluation rules, the system further comprising a notification module to notify the merchant differently according to whether the product identification is incorrect, improper or invalid.

Clause 23. The system of clause 18, further comprising a request module to request a lookup in an external data store of the product identification, the validity module operable to use a result of the lookup in determining the likely validity.

Clause 24. The system of clause 18, further comprising an optical recognition module to optically recognize an image of the product identification and compare the product identification received from the merchant against the image.

Clause 25. A non-transitory machine readable storage medium, including executable program instructions which, when executed by a processor, cause one or more computer systems to perform a method comprising:
receiving a UPC or EAN from a merchant;
evaluating the UPC or EAN against evaluation rules to determine whether the UPC or EAN matches any of the evaluation rules;
determining a likelihood of validity of the UPC or EAN for use with a product associated with the UPC or EAN as a result of evaluating the UPC or EAN against the evaluation rules; and
providing a notification to the merchant based at least in part on a result of evaluating the UPC or EAN against the evaluation rules.

Clause 26. The machine readable storage medium of clause 25, wherein the executable program instructions cause the one or more computer systems to notify the merchant when the UPC or EAN is likely invalid.

The invention claimed is:

1. A computer-implemented method for validating a product identification code, comprising:
under control of one or more computer systems configured with executable instructions:
receiving a request from a merchant to sell a product in an online marketplace;
receiving an image of a Universal Product Code (UPC) for the product from the merchant with the request to sell the product, the UPC including data indicative of a prefix and data indicative of subsequent digits following the prefix;
transforming the image of the UPC into the UPC as digits by decoding the image or using optical recognition;
performing a database lookup for the UPC; and
responsive to failure to find the UPC in the database lookup:
evaluating the prefix of the UPC against evaluation rules, without using the subsequent digits in the evaluating, to determine a likelihood of whether the UPC is valid for product information of the product submitted with the request, wherein a UPC is assumed valid when the prefix is determined to be accurate at least to a defined minimum certainty based on the evaluation rules, wherein the evaluation rules include two or more determinations selected from: whether the UPC is reserved, whether the UPC fits a defined brand, whether the prefix of the UPC is used for a minimum number of other products, or whether there are other existing products in the online marketplace with the same UPC;
notifying the merchant electronically of an acceptability of the UPC for the product using the likelihood of validity; and preventing the merchant from using the UPC when the UPC is determined to be likely invalid to ensure a quality of a product catalog for the online marketplace and to avoid errors in use of the UPC.

2. The computer-implemented method of claim 1, further comprising comparing the prefix of the UPC against a data store of known UPC blocks to determine whether the UPC fits within a known UPC block and to determine whether the merchant matches a registrant of the UPC block.

3. The computer-implemented method of claim 1, further comprising determining whether the UPC is reserved for use other than on products by comparing the UPC to a data store of reserved UPCs.

4. The computer-implemented method of claim 1, further comprising comparing the UPC with other UPCs for a brand of the product to determine the likelihood of validity.

5. The computer-implemented method of claim 1, wherein the prefix includes at least six digits.

\* \* \* \* \*